UNITED STATES PATENT OFFICE.

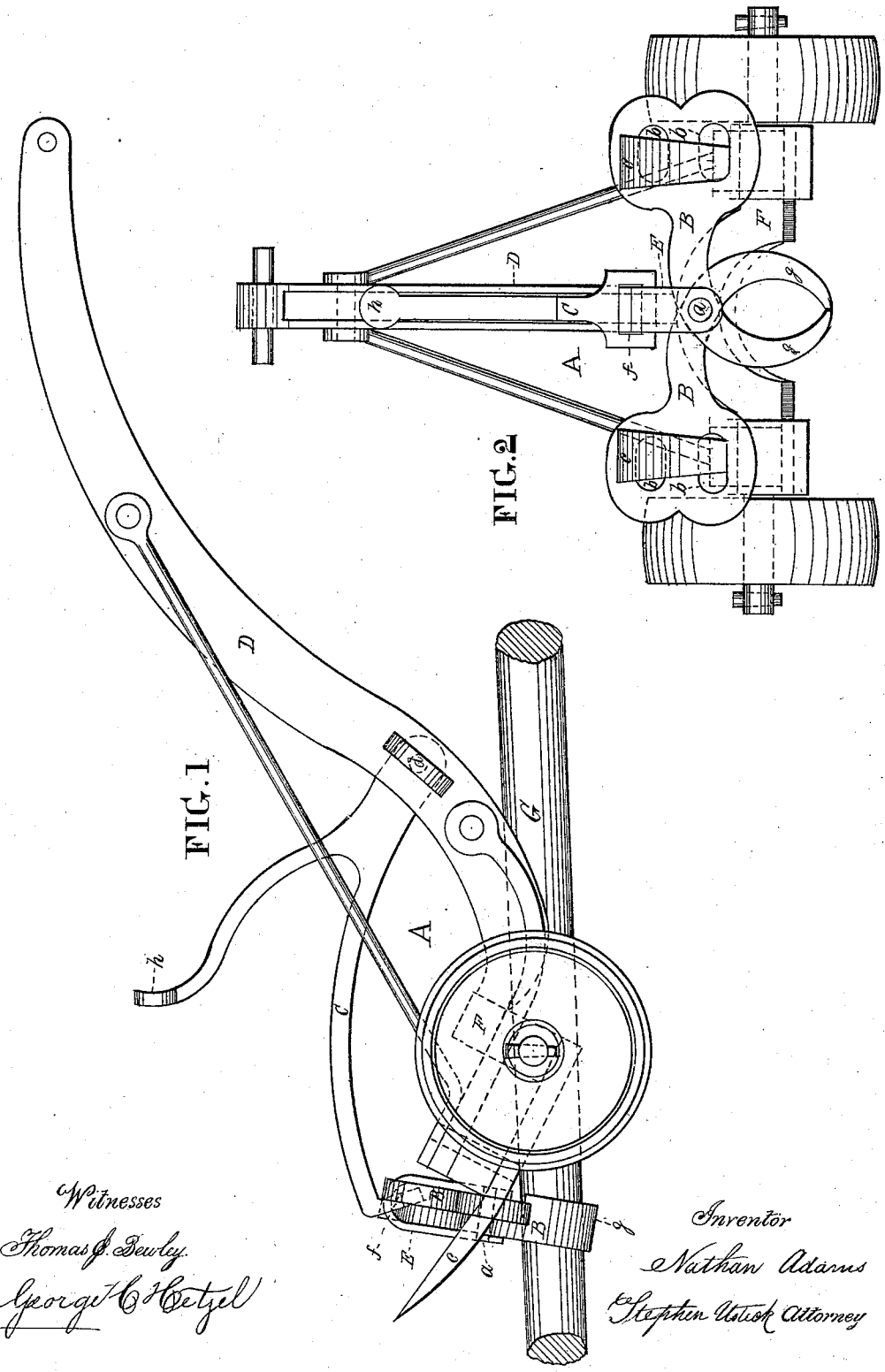

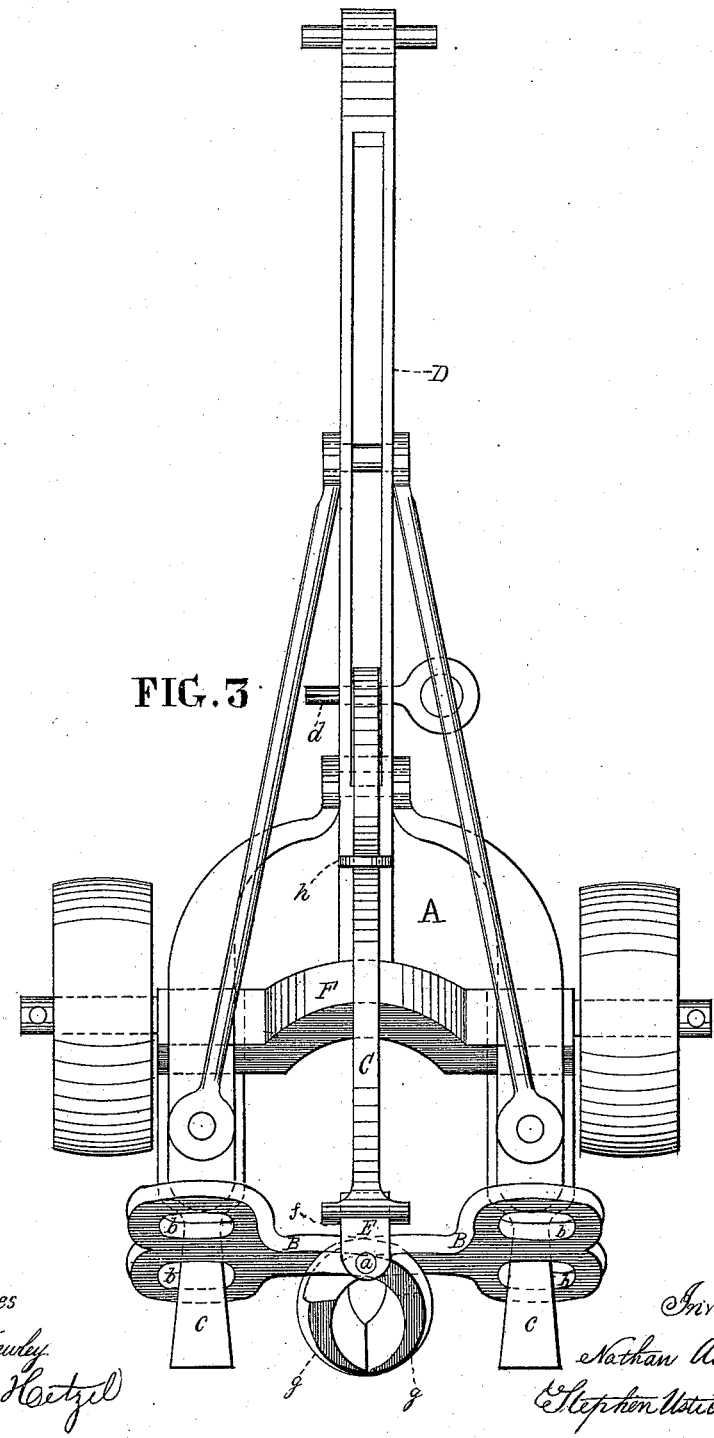

NATHAN ADAMS, OF ALTOONA, PENNSYLVANIA.

IMPROVEMENT IN HAND-TRUCKS.

Specification forming part of Letters Patent No. 169,883, dated November 16, 1875; application filed May 3, 1875.

*To all whom it may concern:*

Be it known that I, NATHAN ADAMS, of Altoona, in the county of Blair and State of Pennsylvania, have invented a Grappling Attachment for Hand-Trucks, of which the following is a specification:

My invention is an attachment to the hand-truck for which Letters Patent were granted to me December 9, 1873, and numbered 145,268.

It consists of a pair of tongs connected with the front of the truck in such a manner as to automatically grapple a rod, bar, or other article, such as heavy forgings, axles, &c., for the purpose of carrying it. A lever, whose fulcrum-pin is connected with the tongue of the truck, has a joint-connection with the tongs, and serves the purpose of opening their jaws to disconnect them from their load. The fulcrum-pin is split, so as to be quickly disengaged from or connected with the truck, and the tongs are provided with loop-holes, which connect with projections at the front of the truck. By these means the tongs are quickly detached from the truck when it has to be used for carrying other kinds of loads to which they are not adapted, and they are expeditiously attached when their use is again required.

In the accompanying drawings, Figure 1 is side elevation of a truck with my improvement attached. Fig. 2 is a front elevation of the same. Fig. 3 is a plan view.

Like letters of reference in all the figures indicate the same parts.

A represents a truck constructed according to my patent above referred to, the hook for holding the load being removed, as it is dispensed with when the present attachment is in use. B B are tongs, connected together by means of the joint-pin $a$. They each have pair of loop-holes $b\ b$, which connect with rests $c\ c$ that project from the front of the truck. The lower loop-holes are used, as represented in the drawings, when the article to be carried is of small or medium size, and the upper holes for loads of larger dimensions. C is a lever, which has a split or spring fulcrum-pin, $d$, that is held by the jaws of the tongue D. The front end of the lever has a loop-hole, $f$, through which the yoke E is passed, and connected at its ends with the joint-pin $a$ of the tongs. The truck-axle F is curved upward to be out of the way of the load. The jaws $g\ g$ of the tongs are connected with the bar G by raising the rear end of the tongue D until the ends of the jaws $g\ g$ bear against the upper side of the bar G, whereby they are opened, and, by the further raising of the tongue, they are passed over the bar and grapple it as the rear end of the tongue is lowered. For unloading the bar the jaws of the tongs are spread apart by bearing the handle $h$ of the lever C backward.

I claim as my invention—

1. The tongs B B, having loop-holes $b$, in combination with the truck, having rests $c\ c$, substantially as and for the purpose set forth.

2. The combination of the lever C, with the tongue D and tongs B B, for discharging the load, substantially as set forth.

NATHAN ADAMS.

Witnesses:
 I. RENNER,
 WM. T. HOWARD.